United States Patent
Shin et al.

(10) Patent No.: US 11,443,651 B2
(45) Date of Patent: Sep. 13, 2022

(54) AVIONICS ELECTRONIC SIGNALS INTELLIGENCE WARFARE INTEGRATION SYSTEM AND CONTROL METHOD THEREOF

(71) Applicant: AGENCY FOR DEFENSE DEVELOPMENT, Daejeon (KR)

(72) Inventors: Dongcho Shin, Daejeon (KR); Unseob Jeong, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 246 days.

(21) Appl. No.: 16/839,479

(22) Filed: Apr. 3, 2020

(65) Prior Publication Data
US 2021/0256866 A1 Aug. 19, 2021

(30) Foreign Application Priority Data
Feb. 13, 2020 (KR) .................... 10-2020-0017879

(51) Int. Cl.
G09B 9/00 (2006.01)
G09B 9/26 (2006.01)
(52) U.S. Cl.
CPC .............. *G09B 9/003* (2013.01); *G09B 9/26* (2013.01)

(58) Field of Classification Search
CPC .................................. G09B 9/003; G09B 9/26
See application file for complete search history.

(56) References Cited

FOREIGN PATENT DOCUMENTS

| KR | 10-1188294 B1 | 10/2012 |
|---|---|---|
| KR | 10-1315531 B1 | 10/2013 |
| KR | 10-2014-0112811 A | 9/2014 |
| KR | 10-2015-0011630 A | 2/2015 |
| KR | 10-1765174 B1 | 8/2017 |

*Primary Examiner* — Robert P Bullington
(74) *Attorney, Agent, or Firm* — Scully Scott Murphy and Presser

(57) ABSTRACT

The present disclosure relates to an avionics electronic warfare integration system capable of simulating avionics electronic warfare and a control method thereof. The avionics electronic warfare integration system includes a scenario generator configured to set a simulation situation simulating avionics electronic warfare and generate an encounter scenario in which a test object encounters at least one target in the simulation situation, a raw data generator configured to generate raw data corresponding to the encounter scenario, a mission equipment mounted on the test object and configured to perform a mission corresponding to the encounter scenario and generate mission data, and a central control device configured to simulate the encounter scenario and verify the mission equipment using the raw data and the mission data.

7 Claims, 9 Drawing Sheets

AVIONICS ELECTRONIC SIGNALS INTELLIGENCE WARFARE INTEGRATION SYSTEM AND CONTROL METHOD THEREOF

CROSS-REFERENCE TO RELATED APPLICATION

Pursuant to 35 U.S.C. § 119(a), this application claims the benefit of the earlier filing date and the right of priority to Korean Patent Application No. 10-2020-0017879, filed on Feb. 13, 2020, the contents of which is incorporated by reference herein in its entirety.

BACKGROUND

1. Technical Field

The present disclosure relates to an avionics electronic signals intelligence warfare integration system, capable of simulating, evaluating and analyzing functions and performances of sub-systems, which are developed when developing a weapon system for collecting avionic electronic warfare signals by an M&S technology, so as to effectively integrate such sub-systems, and a method for controlling the same.

2. Description of the Related Art

In the recent outbreak of war, it has been recognized that electronic warfare is very important for victory or effective defense.

Such electronic warfare may be subdivided into electronic attack, electronic protection, and electronic support according to characteristics.

In one example, Electronic Attack (EA) is characterized by disabling enemy's electronic equipment using electromagnetic waves, and Electronic Protection (EP) is characterized in view of all activities performed to protect its own electronic equipment from enemy's electronic attack. Also, Electronic Support (ES) is characterized by recognizing electronic warfare threat through collection and analysis of collecting and analyzing enemy's electromagnetic spectrum energy and additionally supporting electronic warfare activities through position analysis of the threat and signal analysis and wiretapping.

However, in the most advanced weapon system for attacking or defending an opponent, even if an electronic warfare is an essential item that must be applied, it is inevitable that hundreds to thousands of billions of dollars are required to develop or introduce only an electronic warfare system. Especially, the cost burden is bound to rise to an astronomical level if purchasing a fighter plane equipped with the electronic warfare system.

Therefore, a waste of national costs can be prevented only when it is sufficiently verified in advance how much an electronic warfare system to be developed or introduced will be useful.

To this end, the waste of national costs should be prevented in advance by verifying effectiveness of such electronic warfare system in a manner of simulating or directly demonstrating attack and defense with respect to designated targets.

The effectiveness of electronic attack or electronic protection with respect to a target to attack and a target to defend which are clear and simple is easily verified through simulation or demonstration. On the other hand, the simulation of an avionics electronic support system is very difficult for various reasons. The avionics electronic support system is exposed to plural threats and greatly affected by an electromagnetic wave propagation path and the terrain, which is caused due to various reasons, such as an undetermined time at which electromagnetic waves are to be used.

(Patent Literature 1) KR10-1188294 B1

SUMMARY

The present disclosure is directed to solving the aforementioned problems and other drawbacks.

One aspect of the present disclosure is to provide an avionics electronic signals intelligence warfare integration system, capable of simulating avionics electronic warfare, and a method of controlling the same. Another aspect of the present disclosure is to provide an avionics electronic signals intelligence warfare integration system, capable of integrating and evaluating hardware and software in an avionics electronic signal collection weapon system actually mounted on an aircraft, and a method of controlling the same.

The present disclosure relates to an avionics electronic warfare integration system capable of simulating avionics electronic warfare and a control method thereof.

The avionics electronic warfare integration system may include a scenario generator configured to set a simulation situation simulating avionics electronic warfare and generate an encounter scenario in which a test object encounters at least one target in the simulation situation, a raw data generator configured to generate raw data corresponding to the encounter scenario, a mission equipment mounted on the test object and configured to perform a mission corresponding to the encounter scenario and generate mission data, and a central control device configured to simulate the encounter scenario and verify the mission equipment using the raw data and the mission data.

According to one embodiment, the system may further include a threat signal generator configured to generate and emit a threat signal having a radio frequency according to the encounter scenario, and a radio wave absorber configured to absorb the threat signal and transfer the threat signal to the mission equipment and the central control device.

According to one embodiment, the central control device may verify the threat signal transferred through the radio wave absorber using the raw data.

According to one embodiment, the central control device may be configured to plug-in or plug-out different types of mission equipment.

According to one embodiment, the raw data generator may be configured to perform receiving threat information generated based on the encounter scenario generated by the scenario generator so that the threat information is stored in a memory, receiving an operation parameter from the central control device as a data generation request value, searching for the threat information stored in the memory based on the operation parameter, and generating raw data corresponding to the operation parameter in different ways according to results of the search.

According to one embodiment, the raw data generator may be configured to further perform generating the raw data in a first manner using a frequency and received power of searched threat information corresponding to the operation parameter when the threat information is searched for, and generating the raw data in a second manner different from the first manner when the threat information corresponding to the operation parameter is not searched. According to one embodiment, the raw data generator may be configured to further perform determining a generation period of the raw data based on the operation parameter, and generating the raw data at the determined generation period. The generation period may be adjusted to have a frequency lower than that of a minimum generation period.

According to one embodiment, the raw data generator may be configured to perform generating a COMINT signal including at least one of a threat name, reception strength, a direction finding angle, and a line of sight, generating a FISINT signal including at least one of a FISINT threat frequency and reception strength, and generating an ELINT signal including at least one of an ELINT threat frequency and reception strength.

According to one embodiment, the system may further include a display configured to selectively display in real time at least one of the COMINT signal, the FISINT signal, and the ELINT signal based on a user input.

According to the present disclosure, a System Integration Laboratory (SIL) for developing a weapon system for collecting avionics electronic warfare signals can be provided. The function and performance of mission equipment that is mounted on various aircrafts for collecting avionics electronic warfare signals can be confirmed in a laboratory simulation environment for an effective system integration process, prior to mounting the mission equipment on the aircrafts.

In an avionics electronic warfare integration system and a method of controlling the same according to the present disclosure, data for a threat signal can be generated using information related to an enemy threat signal simulated in a scenario generator and the generated data can be transmitted to a central control device and a storage device. In addition, various types of tests can be supported in a System Integration Laboratory (SIL) of a weapon system for collecting avionics electronic warfare signals, and useful results for system integration and test evaluation upon development of avionics warfare system can be provided.

In an integration system of a weapon system for collecting avionic electronic warfare signals and a method of controlling the same according to the present disclosure, the most important raw data, which is input to test and system integration target devices/prototypes very flexibly with respect to multi-electronic warfare threat environments of various forms, can be generated as input data similar to actual environment based on a scenario under an avionics electronic warfare system integration laboratory environment. Accordingly, a test environment that is substantially the same as the real environment can be provided.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
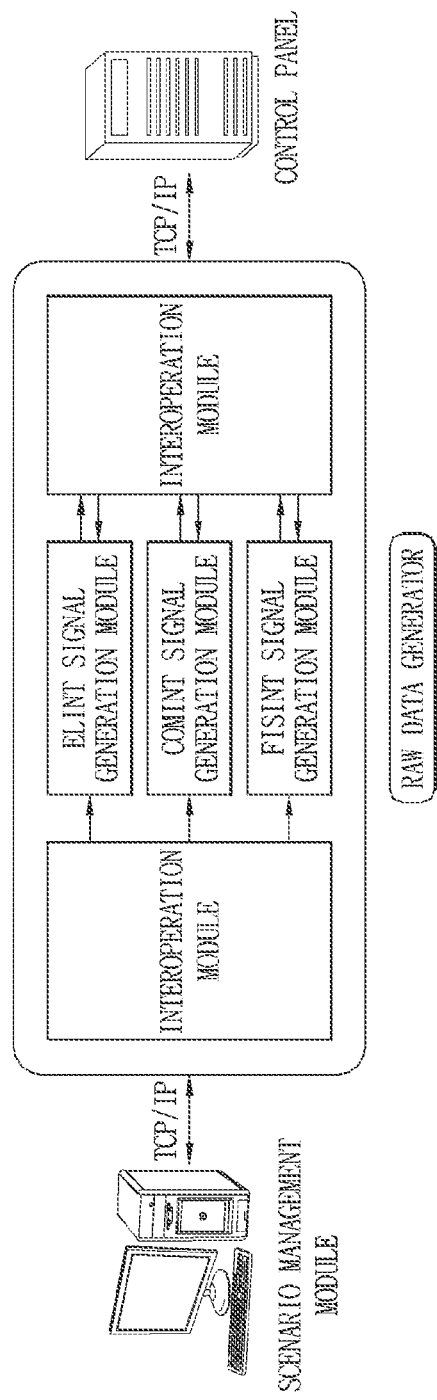
FIG. 1 is a conceptual diagram illustrating an operation of a raw data generator.

FIG. 1 is a conceptual diagram illustrating an operation of a raw data generator.

A raw data generator performs a function of generating data for a threat signal using information on an enemy threat signal simulated from a scenario generator and transmitting the generated data to a central control device and a storage device. To this end, information on a receiver and an operation parameter is received from the central control device. A scenario management module generates and transfers information necessary for simulation using the received information. The raw data generator generates signal data in real time by receiving simulation information related to the threat signal from the scenario generator and transfers the generates signal data to the central control device or storage device. Signal types generated in the raw data generator may include ELINT, COMINT, and FISINT. The raw data generator also performs a function of transmitting a signal saved in a file or signal analysis data as well as a signal generating function.

When developing an avionics electronic warfare system, what is absolutely necessary when performing sufficient tests in a laboratory before performing actual flight tests is an input signal generator for a developed prototype test. A raw data generator proposed herein performs a function of generating data for a threat signal using information on an enemy threat signal simulated in a scenario generator and transmitting the generated data to a central control device and a storage device. That is, information on a receiver and an operation parameter is received from the central control device. A scenario management module generates and transfers information necessary for simulation using the received information. The raw data generator generates signal data in real time by receiving simulation information related to the threat signal from the scenario generator and transfers the generated signal data to the central control device or the storage device. Signal types generated in the raw data generator may include ELINT, COMINT, and FISINT. The raw data generator also performs a function of transmitting a signal saved in a file or signal analysis data as well as such a signal generating function.

Figure 2:
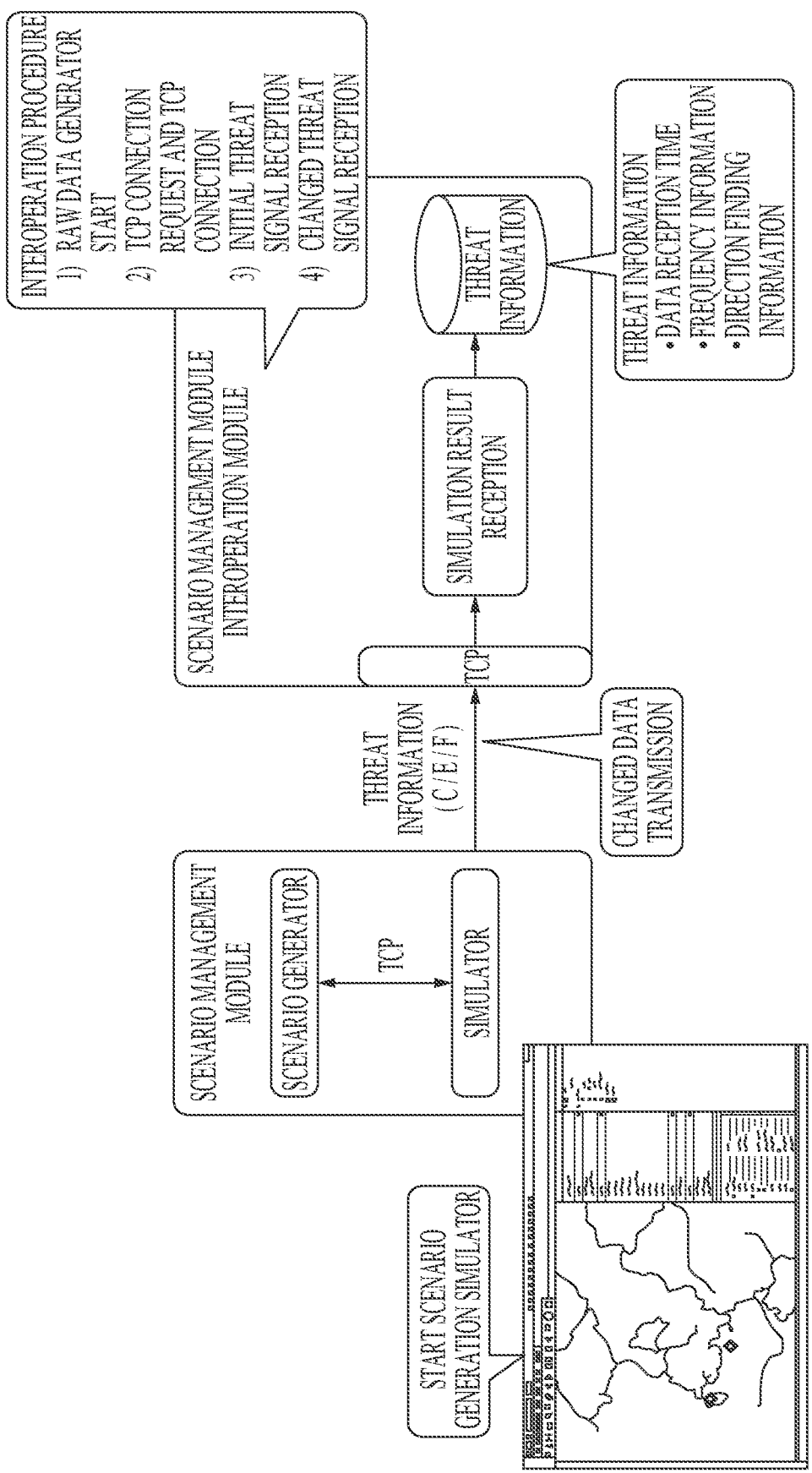
FIG. 2 is a conceptual diagram illustrating an interoperating method between a scenario generator and a raw data generator.

FIG. 2 is a conceptual diagram illustrating an interoperating method between a scenario generator and a raw data generator.

Referring to FIG. 2, the avionics electronic warfare system includes a scenario generator and a raw data generator.

The scenario generator performs a function of modeling a signal transmitter, a signal receiver, an aircraft, etc. constituting avionics electronic warfare, generating a simulation, and managing the generated simulation as a scenario.

The raw data generator performs a function of generating data for a threat signal using information on an enemy threat signal simulated in the scenario generator and transmitting the generated data to a central control device and a storage device.

The raw data generator receives threat data using TCP connection with the scenario generator.

The scenario generator operates as a TCP server and the raw data generator operates as a TCP client.

The raw data generator receives initial threat information and changed threat information from the scenario generator as simulation results, and generates raw data corresponding to the received information.

COMINT (COMmunications INTelligence) generates threat information that includes a COMINT threat name, a threat frequency, and reception strength, and direction detection information that includes a threat name, reception strength, a direction finding angle, and a line of sight. COMINT is signal information confirmed by communication interception.

FISINT (Foreign Instrumentation Signals INTelligence) generates threat information including a FISINT threat frequency and reception strength. Here, FISINT is signal information transmitted by an external electronic machine.

ELINT (ELectronic INTelligence) generates threat information including an ELINT threat frequency and reception strength. ELINT is electronic information obtained by collecting electromagnetic waves from nuclear explosions or electromagnetic radiation and analyzing their properties.

Figure 3:
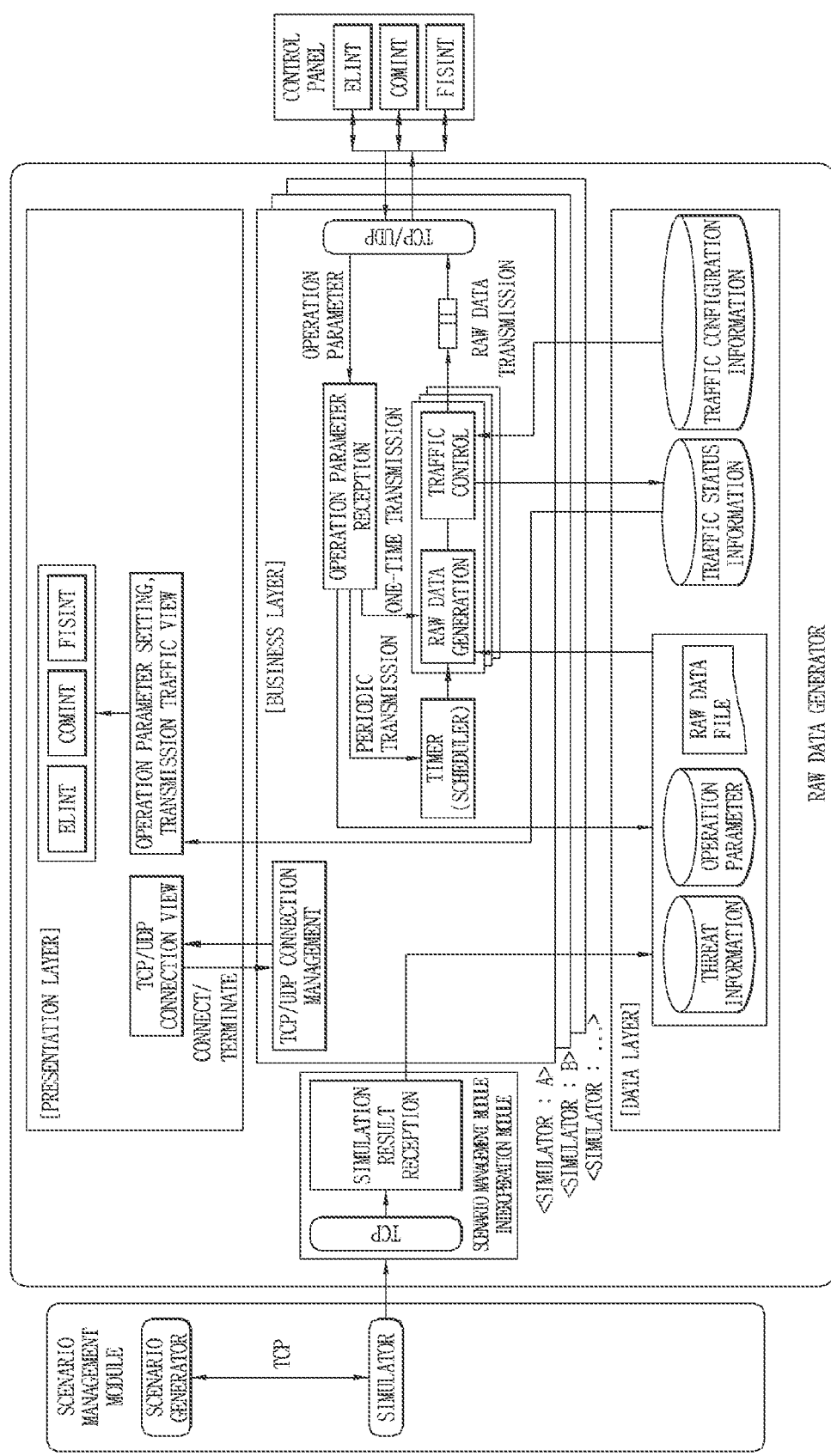
FIG. 3 is a block diagram illustrating components of a raw data generator.

FIG. 3 is a block diagram illustrating components of a raw data generator.

The raw data generator includes a presentation layer, a business layer, and a data layer.

A presentation layer includes a TCP connection view of showing a TCP connection status with control panels of COMINT, ELINT, and FISINT, a UDP connection view, an operation parameter setting view of setting a transmission time interval or reference file for generating raw data, and a transmission traffic view of representing a present status of transmission/reception messages between the raw data generator and the central control device.

The TCP connection view shows a TCP connection status between the raw data generator and the COMINT and FISINT control panels in the case of the COMINT and FISINT. For example, the TCP connection view may show a name, IP address, and TCP connection status of the raw data generator. The TCP connection view additionally shows names of all devices connected to the COMINT and FISINT, and IP addresses of all the devices connected to the COMINT and FISINT.

The UDP connection view shows an open status of a UDP port for UDP connection between a simulator of the raw data generator and the control panel of the ELINT (including LAN to VME) in the case of the ELINT. For example, names of all devices connected to the ELINT, IP addresses of all the devices connected to the ELINT, and a UDP open status for each device may be expressed on the UDP connection view.

The raw data generator generates simulation data such as demodulation, voice, and I/O by referring to information saved in a file. Therefore, the raw data generator provides a function of designating (selecting) a reference file for data generation, and a function of setting a transmission time interval to the central control device and information for generating other data.

A business layer performs a function of generating raw data.

The business layer receives a data generation request value (or operation parameter) from the central control device, and generates raw data corresponding to the request value. At this time, the business layer may search for threat information linked from the scenario generator and generate raw data in different ways according to the search results.

Furthermore, the business layer manages TCP/UDP network connection and receives operation parameters for receiving and processing messages from the COMINT, FISINT, and ELINT control panels for each simulator.

The business layer performs a timer function of registering a data generation period in a timer, calling a data generation function according to the period registered in the timer, and transmitting generated data to the central control device.

Upon receiving a parameter from the central control device, the raw data generator periodically generates data, specifically, spectrum or decoration data, and transmits the generated data to the central control device until receiving task completion or device initialization from the central control device. Therefore, after registering the data generation period in the timer, the timer calls the data generation function according to the registered period to transmit the generated data to the central control device.

The data layer manages threat information related to COMINT, FISINT, and ELINT, which interoperate (cooperate, link) together in the scenario generator, in the memory. The data layer manages messages received from the central control device in the memory, and then manages operation parameters required to generate data based on this managed information.

The data layer manages simulation data such as demodulation, voice, and I/O in a file unit, and performs a raw data file management function for referring to contents in the file when data is generated. Furthermore, the data layer manages traffic status information managing a data transmission/reception rate for monitoring a transmission/reception message traffic status between the raw data generator and the central control device.

Figure 4:
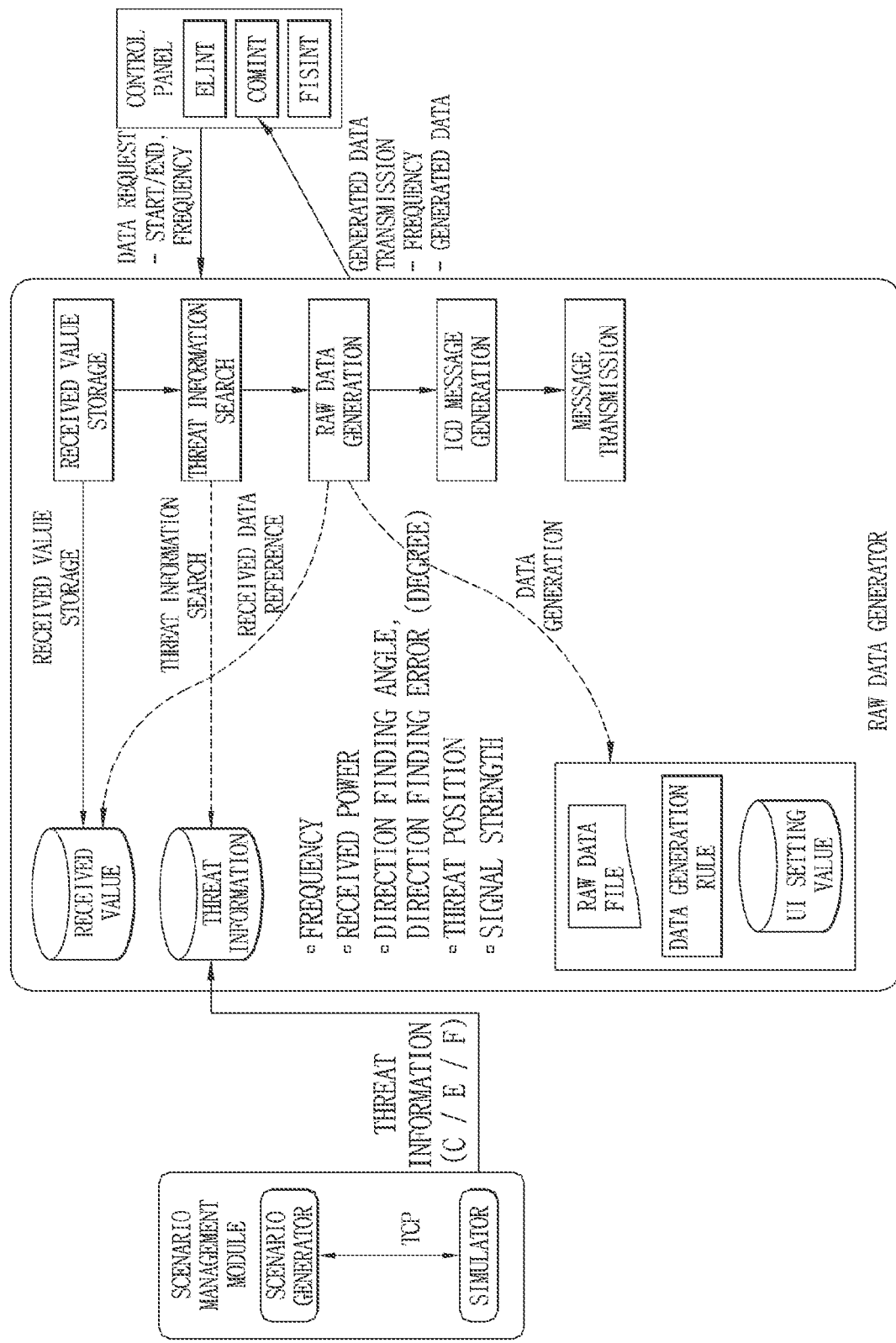
FIG. 4 is a conceptual diagram illustrating a method of generating raw data in the raw data generator of FIG. 3.

FIG. 4 is a conceptual diagram illustrating a method of generating raw data in the raw data generator of FIG. 3.

The raw data generator receives a data generation request value (or operation parameter) from the central control device and stores the received data generation request value in the memory.

The raw data generator distinguishes whether it is data that should be generated only once or periodically, based on the operation parameter received from the central control device. For data that needs to be generated periodically, the raw data generator may register a schedule in the timer and generate raw data periodically.

The timer may determine a raw data generation period based on the operation parameter. At this time, the generation period is adjusted to have a frequency lower than a minimum generation period. This is to prevent an occurrence of system load due to frequent generation of raw data. For example, the minimum generation period may be 1/1000 sec.

The raw data generator searches for threat information linked (received) from the scenario generator, and generates raw data in different ways according to results of the search.

For example, when there is threat information, the raw data generator generates raw data in a first manner by applying the threat information. On the other hand, when there is no threat information, the raw data generator generates raw data in a second manner different from the first manner.

The raw data generator receives the threat information from the scenario generator. The threat information may include at least one of frequency, received power, a direction finding angle, a direction finding error, a threat position, and signal strength.

Figure 5:
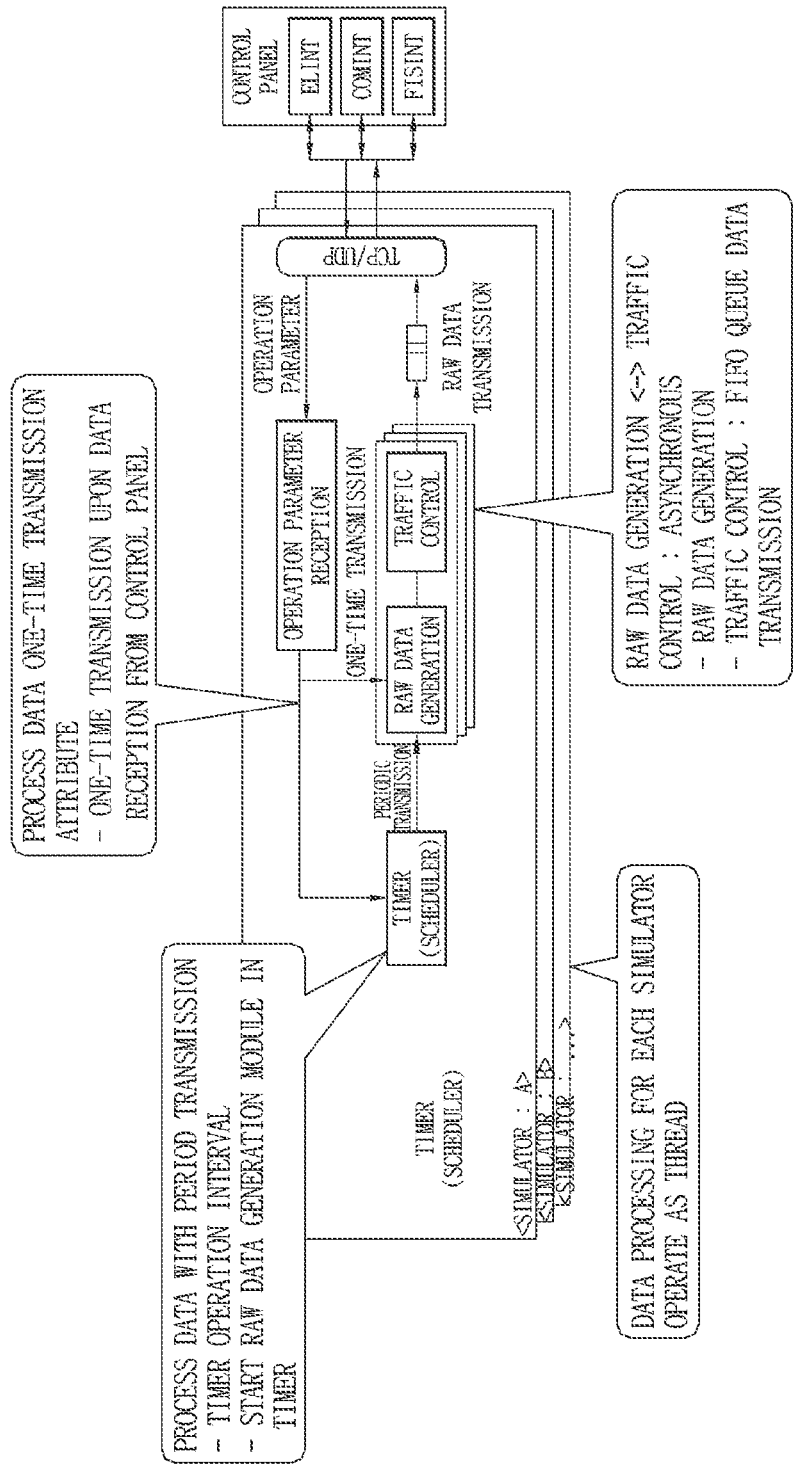
FIG. 5 is a conceptual diagram illustrating a method of processing a large amount of data by a raw data generator.

FIG. 5 is a conceptual diagram illustrating a method of processing a large amount of data by a raw data generator.

When designing a device that generates a simulated threat signal in avionics electronic warfare, it is essential to consider a method of processing a large amount of data that is congested as in an actual environment.

The raw data generator generates raw data as in an actual environment. When a large amount of data is generated, the raw data generator controls traffic by adjusting an amount of data to be transmitted to the central control device. For example, the raw data generator monitors an amount of raw data that is generated for a unit time. If an amount of raw data satisfies a first condition, the raw data generator includes raw data generated for a first reference time in one transmission queue and transmits such raw data. When an amount of raw data satisfies a second condition, the raw data generator includes raw data generated for a second reference time in one transmission queue and transmit it. Consequently, an amount of raw data included in one transmission queue varies according to an amount of raw data generated for a unit time.

The raw data generator may change a predetermined raw data generation period when a larger amount of data than a reference amount is generated for a unit time. For example, the generation period may gradually decrease according to an amount of data generated. In a state where it has been determined that raw data is set every 10 seconds, when an amount of raw data generated is larger than a reference amount, the generation period may be changed from 10 seconds to 20 seconds.

When a generation period of specific raw data becomes slower than a maximum period (for example, when the generation period is changed to 2 minutes while the maximum period is set to 1 minute), the raw data generator may delete the generation period of the specific raw data. In this case, the generation of the specific raw data is stopped.

Even in a state where the central control device commands the generation of the specific raw data at a constant period, when an amount of raw data generated exceeds a reference amount, the raw data generator may adjust the generation period, thereby controlling system overload. Furthermore, the raw data generator may stop the generation of the specific raw data itself.

Figure 6:
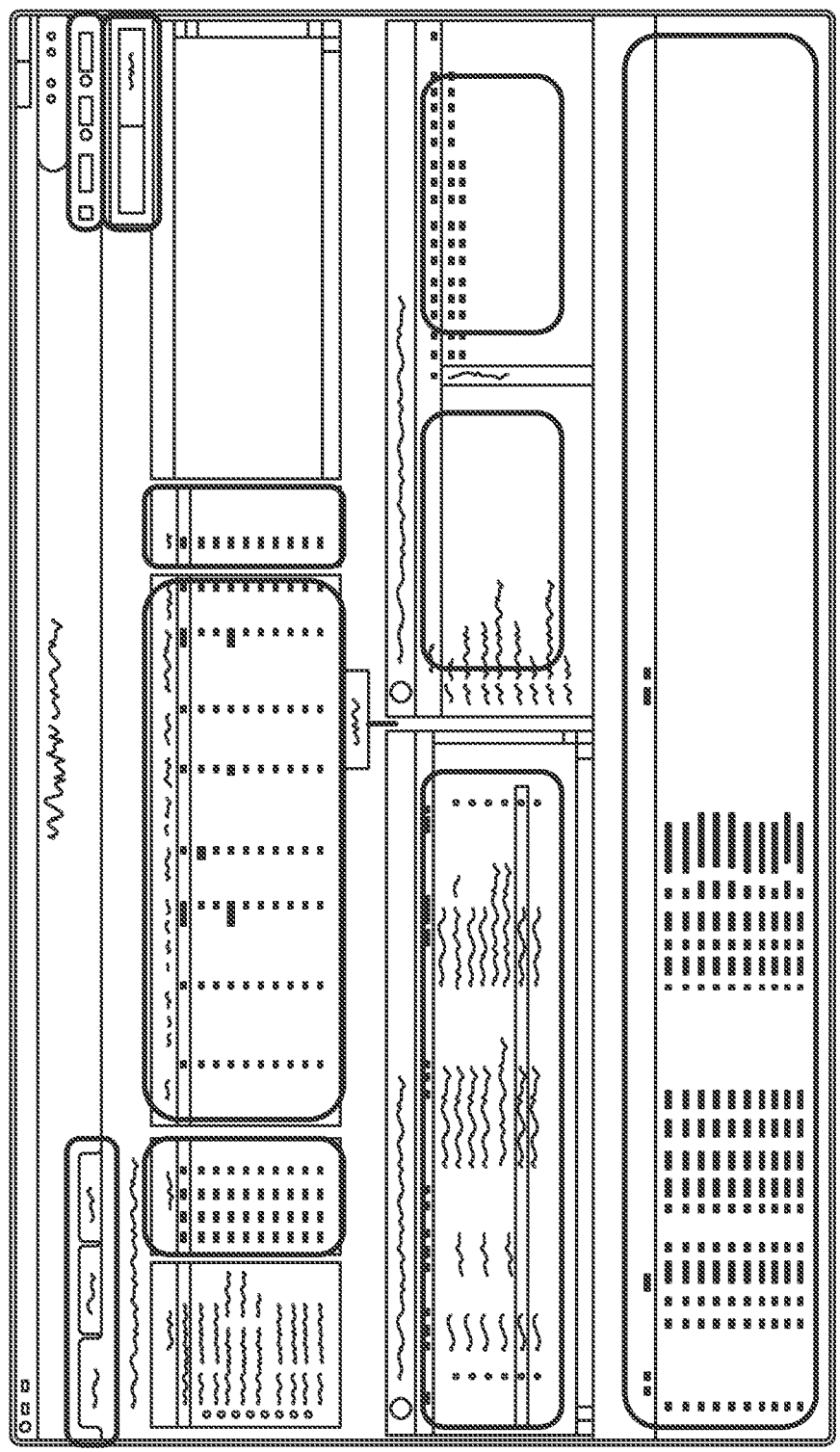
FIG. 6 is an exemplary view illustrating a user interface provided by a raw data generator.

FIG. 6 is an exemplary view illustrating a user interface provided by a raw data generator.

The raw data generator according to the present disclosure provides menus for selecting COMINT, ELINT, and FISINT.

The raw data generator provides menus that enable start and stop. When the start menu is selected, the raw data generator opens a TCP port in the case of COMINT and ELINT and a UDP port number in the case of ELINT, to all simulators, and performs an initialization for resources. The initialization for the resources refers to an operation of initializing file reference information and data generation period for generating raw data. When the stop menu is selected, the raw data generator closes the TCP and UDP ports which have been opened in the case of selecting the start menu, and releases the resources which are being used.

The COMINT and FISINT represent a TCP connection status with the central control device, and are displayed as a blue icon when a session is connected while displayed as a red icon when a session is disconnected.

The ELINT represents an open status of the UDP port, and is displayed as a blue icon when the UDP port is successfully opened while displayed as a red icon when the UDP port is unsuccessfully opened.

The raw data generator may show a data transmission/reception status between the COMINT and FISINT and the central control device and a data transmission/reception status between the ELINT and the central control device (including LAN to VME).

Furthermore, the raw data generator may provide a window for setting a file referred to when generating raw data, and other operation parameters. At least one of an operation parameter and threat information used to generate the raw data may be displayed on a display.

Figure 7:
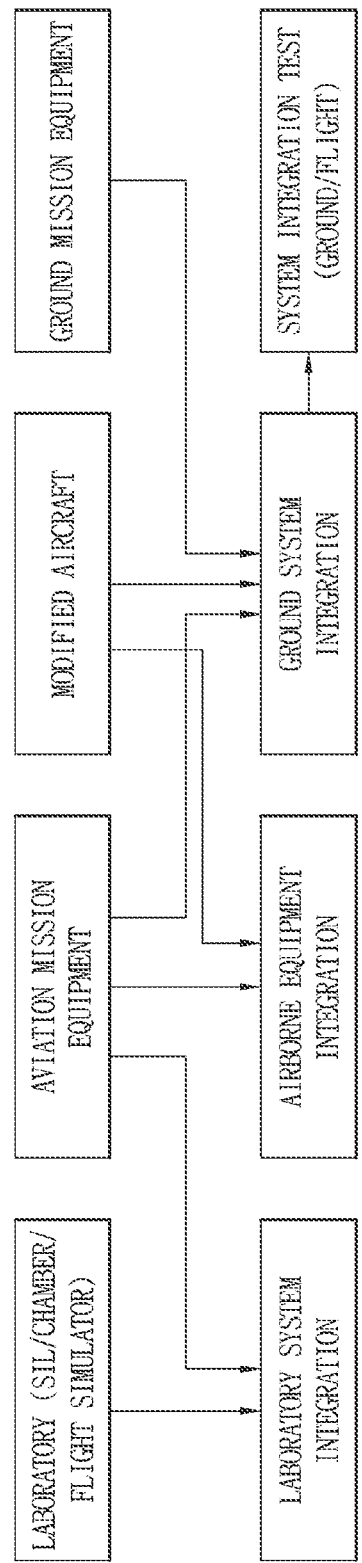
FIG. 7 is a conceptual diagram of an avionics electronic warfare integration system.

FIG. 7 is a conceptual diagram of an avionics electronic warfare integration system.

An avionics electronic warfare integration system may set a simulation situation that simulates avionics electronic warfare and perform an encounter scenario in which a test object encounters one or more targets in the simulation situation. The test object may be a flying object (or aircraft).

The avionics electronic warfare integration system may include at least one of a laboratory where the encounter scenario is executed, aviation mission equipment that is mounted on the test object to perform a mission corresponding to the encounter scenario, the test object, and ground mission equipment that is located on the ground other than the test object to perform a mission corresponding to the encounter scenario through communication with the test object.

The laboratory may include a system integration laboratory (SIL), an anechoic chamber, and a flight simulator.

Figure 8:
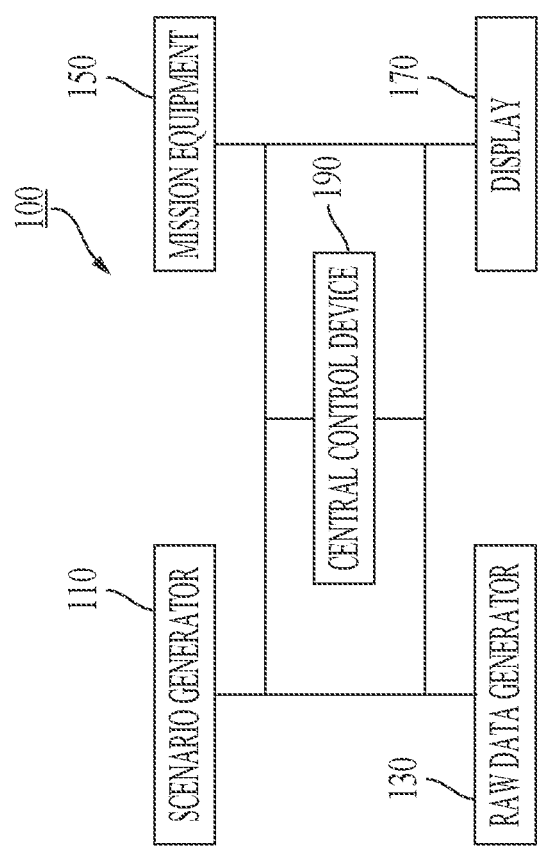
FIG. 8 is a block diagram illustrating one example of an avionics electronic warfare integration system.

FIG. 8 is a block diagram illustrating one example of an avionics electronic warfare integration system.

The avionics electronic warfare integration system 100 includes a scenario generator 110, a raw data generator 130, mission equipment 150, a display 170, and a central control device 190.

The scenario generator 110 sets a simulation situation that simulates avionics electronic warfare, and generates an encounter scenario in which the test object encounters at least one target in the simulation situation.

The raw data generator 130 generates raw data corresponding to the encounter scenario.

The raw data generator 130 receives threat information generated by the encounter scenario generated by the scenario generator 110 and stores the received threat information in the memory. The raw data generator 130 receives an operation parameter from the central control device 190 as a data generation request value, and searches for the threat information stored in the memory based on the operation parameter. In addition, the raw data generator 130 may generate raw data corresponding to the operation parameter in different ways according to results of the search.

According to the embodiment described above with reference to FIGS. 1 to 6, the raw data generator may generate raw data, change a raw data generation period, and generate a COMINT signal, a FISINT signal, and an ELINT signal.

The mission equipment 150 is mounted on the test object, performs a mission corresponding to the encounter scenario, and generates mission data.

The display 170 may selectively display at least one of the COMINT signal, the FISINT signal, and the ELINT signal based on a user input in real time.

The central control device 190 simulates the encounter scenario and verifies the mission equipment 150 using the raw data and the mission data. In a simulated threat environment, the central control device 190 verifies whether the mission equipment 150 is properly performing an assigned mission according to the encounter scenario.

The simulated threat environment is input and processed in COMINT/ELINT/FISINT equipment, and transmitted to the mission equipment 150 through data link equipment to be demonstrated in the mission equipment 150. The central control device 190 analyzes mission data generated by the mission equipment 150 to determine whether or not the mission equipment has normally performed the mission.

Specifically, the central control device 190 verifies whether the mission equipment 150 meets avionics electronic warfare system standards stored in the memory. In addition to testing the mission equipment 150 itself, the central control device 190 tests whether the mission equipment 150 interoperates with airborne equipment, ground mission equipment, avionics equipment, and other accessory equipment constituting the avionics electronic warfare integration system.

The central control device 190 is configured to plug-in or plug-out different types of mission equipment. Accordingly, various types of mission equipment can be tested.

The avionics electronic warfare integration system 100 may verify integrity of function and performance of the mission equipment 150 and generate quantitative data to determine possibility to be mounted on a test object.

Figure 9:
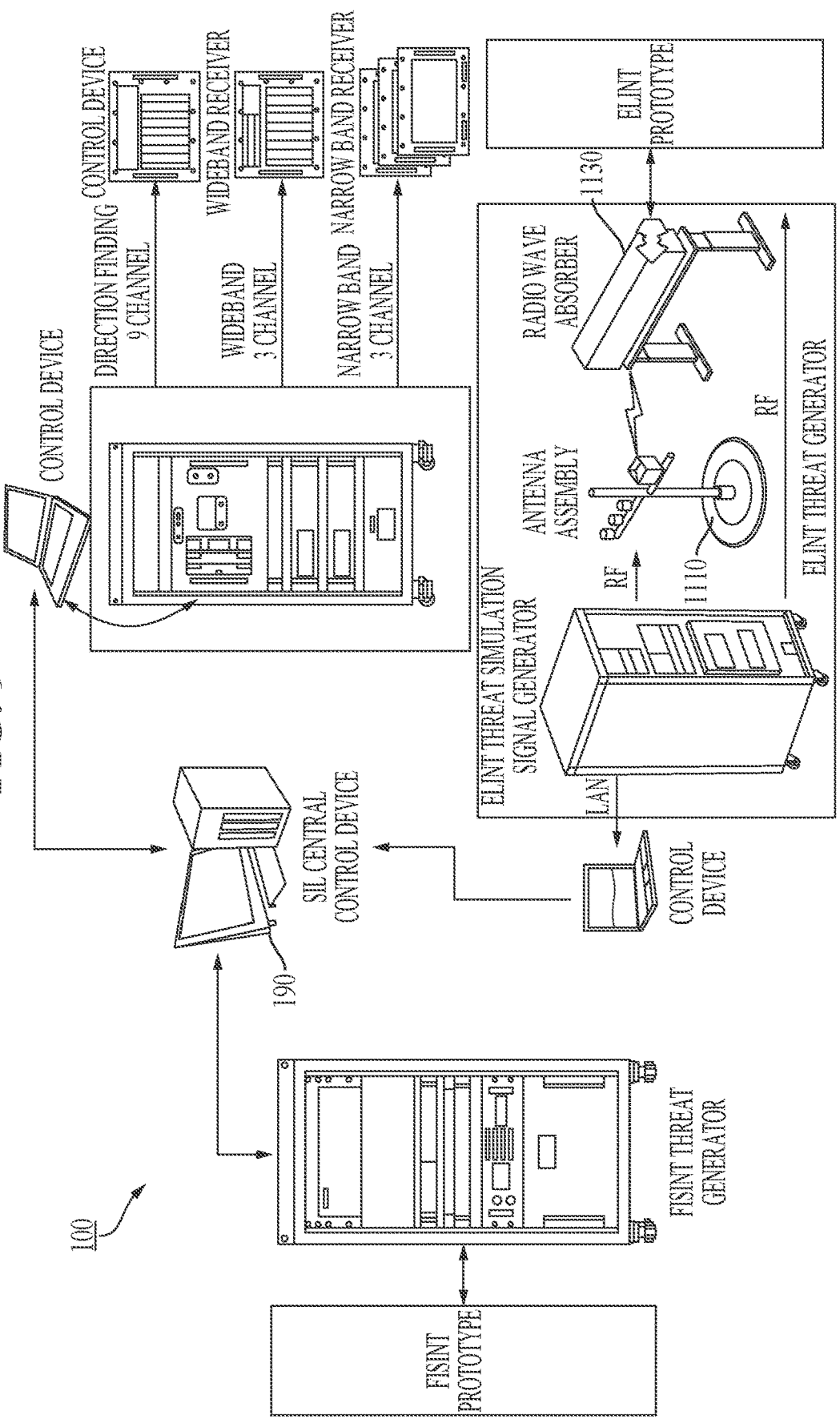
FIG. 9 is a conceptual diagram illustrating a threat signal generator and a radio wave absorber included in the avionics electronic warfare integration system.

FIG. 9 is a conceptual diagram illustrating a threat signal generator and a radio wave absorber included in the avionics electronic warfare integration system.

The avionics electronic warfare integration system 100 may further include a threat signal generator 1110 and a radio wave absorber 1130.

The threat signal generator 1110 generates and releases a threat signal having a radio frequency according to the encounter scenario. The threat signal generator 1110 may be, for example, an antenna or a radar.

The radio wave absorber 1130 absorbs the threat signal and transfers the threat signal to the mission equipment 150 and the central control device 190. The radio wave absorber 1130 may convert an analog signal into a digital signal.

The mission equipment 150 performs a mission in response to the threat signal, and generates mission data corresponding to the mission.

The central control device 190 verifies the threat signal transferred through the radio wave absorber 1130 using raw data generated by the raw data generator 130.

The avionics electronic warfare integration system can perform not only software tests but also hardware tests, so as to acquire more accurate test results. Furthermore, integrated functions and performances can be checked, and interoperability between equipment can be verified. For example, the interoperation adequacy with COMINT with respect to a direction finding request of FISINT can be verified.

The present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the terminal.

Therefore, it should also be understood that the above-described embodiments are not limited by any of the details of the foregoing description, unless otherwise specified, but rather should be construed broadly within its scope as defined in the appended claims. The scope of the present invention should be determined by rational interpretation of the appended claims, and all changes within the scope of equivalents of the present invention are included in the scope of the present invention.

What is claimed is:

1. An avionics electronic warfare integration system for processing avionics electronic warfare signals to verify function and performance of a mission equipment in a laboratory simulation environment, comprising:
   a scenario generator configured to set a simulation situation simulating avionics electronic warfare and generate an encounter scenario in which a test object encounters at least one target in the simulation situation;
   a raw data generator configured to generate raw data corresponding to the encounter scenario;
   the mission equipment mountable to the test object and configured to perform a mission corresponding to the encounter scenario and generate mission data;
   a threat signal generator configured to generate and emit a threat signal having a radio frequency according to the encounter scenario;
   a radio wave absorber configured to absorb the threat signal and transfer the threat signal to the mission equipment and the central control device; and a central control device configured to simulate the encounter scenario and verify the mission equipment using the raw data and the mission data, such that the function and performance of the mission equipment can be verified prior to mounting the mission equipment to the test object and possibility of mounting the mission equipment to the test object based on the verification can be determined, wherein the central control device verifies the threat signal transferred through the radio wave absorber using the raw data.

2. The system of claim 1, wherein the central control device is configured to plug-in or plug-out different types of mission equipment.

3. The system of claim 1, wherein the raw data generator is configured to perform:

receiving threat information generated based on the encounter scenario generated by the scenario generator so that the threat information is stored in a memory;

receiving an operation parameter from the central control device as a data generation request value;

searching for the threat information stored in the memory based on the operation parameter; and generating the raw data corresponding to the operation parameter according to results of the search.

4. The system of claim 3, wherein the raw data generator is configured to further perform:

generating, when the threat information corresponding to the operation parameter is searched for, the raw data in a first manner using a frequency and received power of the threat information; and generating the raw data in a second manner different from the first manner when the threat information corresponding to the operation parameter is not searched.

5. The system of claim 4, wherein the raw data generator is configured to further perform:

determining a generation period of the raw data based on the operation parameter; and generating the raw data at the generation period, and wherein the generation period is adjusted to have a frequency lower than that of a minimum generation period.

6. The system of claim 1, wherein the raw data generator is configured to perform:

generating a COMmunications INTelligence (COMINT) signal including at least one of a threat name, reception strength, a direction finding angle, and a line of sight;

generating a Foreign Instrumentation Signals INTelligence (FISINT) signal including at least one of a FISINT threat frequency and the reception strength; and generating an ELectronic INTelligence (ELINT) signal including at least one of an ELINT threat frequency and the reception strength.

7. The system of claim 6, further comprising a display configured to selectively display in real time at least one of the COMINT signal, the FISINT signal, and the ELINT signal based on a user input.

* * * * *